(12) United States Patent
Sanghvi et al.

(10) Patent No.: US 10,547,859 B2
(45) Date of Patent: Jan. 28, 2020

(54) DYNAMIC FRAME PADDING IN A VIDEO HARDWARE ENGINE

(71) Applicant: Texas Instruments Incorporated, Dallas, TX (US)

(72) Inventors: Hetul Sanghvi, Bangalore (IN); Mihir Narendra Mody, Bangalore (IN); Niraj Nandan, Bangalore (IN); Mahesh Madhukar Mehendale, Bangalore (IN); Subrangshu Das, Karnataka (IN); Dipan Kumar Mandal, Bangalore (IN); Nainala Vyagrheswarudu, Bangalore (IN); Vijayavardhan Baireddy, Hyderabad (IN); Pavan Venkata Shastry, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/653,561

(22) Filed: Jul. 19, 2017

(65) Prior Publication Data
US 2017/0318304 A1 Nov. 2, 2017

Related U.S. Application Data

(63) Continuation of application No. 14/661,770, filed on Mar. 18, 2015.

(30) Foreign Application Priority Data

Mar. 18, 2014 (IN) ............................ 1420/CHE/2014

(51) Int. Cl.
*H04N 11/02* (2006.01)
*H04N 19/43* (2014.01)
*H04N 19/51* (2014.01)

(52) U.S. Cl.
CPC ............. *H04N 19/43* (2014.11); *H04N 19/51* (2014.11)

(58) Field of Classification Search
CPC ....................................................... H04N 19/43
USPC ........................................ 375/240.01–240.29
See application file for complete search history.

(56) References Cited

U.S. PATENT DOCUMENTS

| | | | | |
|---|---|---|---|---|
| 5,801,778 A | * | 9/1998 | Ju ........................ | H04N 19/105 375/240.06 |
| 6,005,980 A | * | 12/1999 | Eifrig ................... | H04N 19/563 375/E7.076 |
| 6,108,039 A | * | 8/2000 | Linzer ................. | H04N 19/105 348/699 |
| 9,313,493 B1 | * | 4/2016 | Maaninen ............ | H04N 19/176 |

(Continued)

*Primary Examiner* — Leron Beck
(74) *Attorney, Agent, or Firm* — John R. Pessetto; Charles A. Brill; Frank D. Cimino

(57) ABSTRACT

A video hardware engine which support dynamic frame padding is disclosed. The video hardware engine includes an external memory. The external memory stores a reference frame. The reference frame includes a plurality of reference pixels. A motion estimation (ME) engine receives a current LCU (largest coding unit), and defines a search area around the current LCU for motion estimation. The ME engine receives a set of reference pixels corresponding to the current LCU. The set of reference pixels of the plurality of reference pixels are received from the external memory. The ME engine pads a set of duplicate pixels along an edge of the reference frame when a part area of the search area is outside the reference frame.

25 Claims, 13 Drawing Sheets

(56) References Cited

U.S. PATENT DOCUMENTS

| Publication No. | Date | Inventor | Classification | Subclass |
|---|---|---|---|---|
| 2003/0106053 A1* | 6/2003 | Sih | H04N 19/43 | 725/25 |
| 2003/0202588 A1* | 10/2003 | Yu | H04N 19/593 | 375/240.12 |
| 2004/0240553 A1* | 12/2004 | Kurihara | H04N 5/145 | 375/240.16 |
| 2005/0053290 A1* | 3/2005 | Wada | H04N 19/563 | 382/233 |
| 2006/0245495 A1* | 11/2006 | Han | H04N 19/187 | 375/240.13 |
| 2007/0076795 A1* | 4/2007 | Lee | H04N 19/52 | 375/240.16 |
| 2007/0127573 A1* | 6/2007 | Soroushian | H04N 19/51 | 375/240.16 |
| 2009/0074312 A1* | 3/2009 | Kyung | H04N 19/51 | 382/236 |
| 2010/0080288 A1* | 4/2010 | Hamamoto | H04N 19/176 | 375/240.03 |
| 2012/0082216 A1* | 4/2012 | Wang | H04N 19/70 | 375/240.08 |
| 2012/0230392 A1* | 9/2012 | Zheng | H04N 19/197 | 375/240.02 |
| 2012/0230409 A1* | 9/2012 | Chen | H04N 19/105 | 375/240.15 |
| 2012/0320970 A1* | 12/2012 | Drugeon | H04N 19/563 | 375/240.02 |
| 2013/0028330 A1* | 1/2013 | Zhang | G06T 1/00 | 375/E7.104 |
| 2013/0044118 A1* | 2/2013 | Rajendran | G06T 1/20 | 345/506 |
| 2013/0083853 A1* | 4/2013 | Coban | H04N 19/563 | 375/240.16 |
| 2013/0128978 A1* | 5/2013 | Yie | H04N 19/176 | 375/240.16 |
| 2013/0136183 A1* | 5/2013 | Kim | H04N 19/52 | 375/240.16 |
| 2014/0064369 A1* | 3/2014 | Laroche | H04N 19/52 | 375/240.13 |
| 2014/0301461 A1* | 10/2014 | Jeon | H04N 19/52 | 375/240.12 |
| 2015/0271512 A1* | 9/2015 | Sanghvi | H04N 19/43 | 375/240.16 |
| 2017/0318304 A1* | 11/2017 | Sanghvi | H04N 19/43 | |

\* cited by examiner

DYNAMIC FRAME PADDING IN A VIDEO HARDWARE ENGINE

CROSS REFERENCES TO RELATED APPLICATIONS

This continuation application claims priority to U.S. patent application Ser. No. 14/661,770, filed Mar. 18, 2015, which application claims priority to India provisional patent application No. 1420/CHE/2014 filed on Mar. 18, 2014, both applications of which are hereby incorporated by reference in their entirety.

TECHNICAL FIELD

The present disclosure is generally related to video coding and more particularly to dynamic frame padding in a video hardware engine.

BACKGROUND

Video compression standards are becoming complex, starting from MPEG1/2 to the latest generation video standards HEVC (high efficiency video coding)/H.265. There is also scaling in resolution from High Definition (HD) to Ultra-HD (4K) resolution. This leads to increase of 4× complexity. This is further compounded by frame rate scaling from 30 to 60 fps (frame per second), which means an increase of 2× complexity.

Thus, a video hardware engine requires huge computation power that can be met by hardwired solution over fully programmable solutions. Multi-format support is another critical requirement in portable devices like smartphones and tablets. Thus, the solution also needs to cater to multiple format video standards such as MPEG1/2/4, H.261/3/4/5, RV8/9, AVS, and VP6/7/8. Based on actual application and market needs, the video hardware engine is configured for various formats by means of firmware.

The multiple video standards require extension of border pixels on previous reconstructed frame, thus creating a reconstructed padded frame in an external memory. This is also known as padding. The reconstructed padded frame is large in size as compared to reconstructed frame. The reconstructed padded frame is stored in the external memory, and is used in video coding. This approach increases the overhead of the video hardware engine since an additional memory bandwidth is required for large sized reconstructed padded frames. The approach also degrades the performance of the video hardware engine.

SUMMARY

According to one aspect of the disclosure, a video hardware engine is disclosed. The video hardware engine includes an external memory. The external memory stores a reference frame. The reference frame includes a plurality of reference pixels. A motion estimation (ME) engine receives a current LCU (largest coding unit), and defines a search area around the current LCU for motion estimation. The ME engine receives a set of reference pixels corresponding to the current LCU. The set of reference pixels of the plurality of reference pixels are received from the external memory. The ME engine pads a set of duplicate pixels along an edge of the reference frame when a part area of the search area is outside the reference frame.

BRIEF DESCRIPTION OF THE VIEWS OF DRAWINGS

DETAILED DESCRIPTION OF THE EMBODIMENTS

Figure 1:
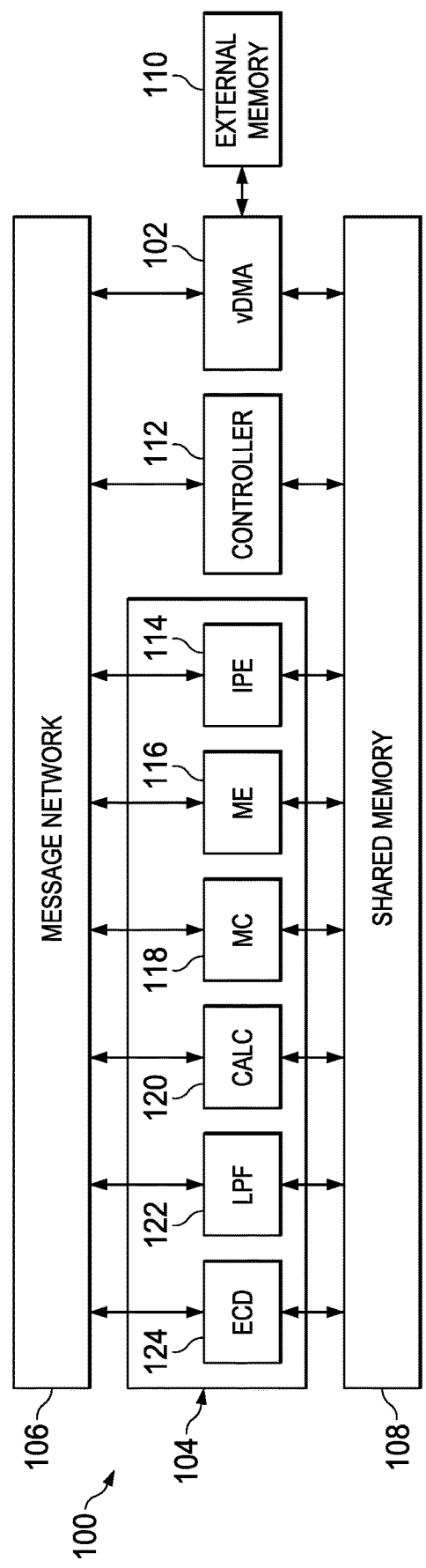
FIG. 1 is a block diagram of a video hardware engine, in accordance with which various embodiments can be implemented.

FIG. 1 is a block diagram of a video hardware engine 100, in accordance with which various embodiments can be implemented. The video hardware engine 100 includes a controller 112, a vDMA (video direct memory access) engine 102 and a video hardware accelerator unit 104. In an example, the controller 112 is a low-end processing unit. In another example, the controller 112 is a RISC (reduced instruction set computing) processor. In yet another example, the video hardware engine 100 includes a plurality of controllers. The controller 112, the vDMA (video direct memory access) engine 102 and the video hardware accelerator unit 104 communicate through a message network 106. The controller 112, the vDMA engine 102 and the video hardware accelerator unit 104 use a shared memory 108.

The video hardware accelerator unit 104 includes hardware accelerator engines, which include the following, but not limited to, a spatial intra prediction (IPE) engine 114, a motion estimation (ME) engine 116, a motion compensation (MC) engine 118, a transform and quantization (CALC) engine 120, a deblocking filter (LPF) engine 122 and an entropy codec (ECD) engine 124.

In one version, the video hardware accelerator unit 104 includes a plurality of hardware accelerator engines. All the hardware accelerator engines in the video hardware accelerator unit 104 communicate with each other and with the controller 112 through the message network 106. The hardware accelerator engines are coupled to the shared memory 108 for exchange of data.

The vDMA engine 102 is coupled to an external memory 110. The external memory 110, in one example, is a DDR (double data rate) memory. The external memory 110 stores a plurality of frames corresponding to a video data. The external memory 110 in one version is embedded in the video hardware engine 100. In another version, the external memory 110 is not embedded in the video hardware engine 100. The video hardware engine 100 is one of the following, but not limited to, a multi-format video decoder, a multi-format video encoder and a multi-format encoder and decoder.

The multi-format encoder and decoder support functionality of both an encoder and a decoder. A multi-format video hardware engine supports various video formats such as, but not limited to, MPEG2, HEVC and H.264. The video hardware engine 100 may include one or more additional components known to those skilled in the relevant art and are not discussed here for simplicity of the description.

The operation of the video hardware engine 100 illustrated in FIG. 1 is explained now. The controller 112 is configured to operate in an encode mode and a decode mode. In encode mode, the controller 112 receives a plurality of frames and encode attributes associated with each frame of the plurality of frames, from a processing unit external to the video hardware engine 100. The video hardware engine 100 processes the plurality of frames and the encode attributes to generate a compressed bit-stream and an encode status. The controller 112 provides the compressed bit-stream and the encode status to the processing unit external to the video hardware engine 100.

In decode mode, the controller 112 receives a compressed bit-stream and decode attributes from the processing unit. The video hardware engine 100 processes the compressed bit-stream and the decode attributes to generate a plurality of frames and a decode status. The controller 112 provides the plurality of frames and the decode status to the processing unit.

The vDMA engine 102 directly provides the plurality of frames, encode attributes associated with each frame, the compressed bit-stream and decode attributes; from the shared memory 108 to the external memory 110 and vice-versa. The ME engine 116, during the encode mode, estimates motion information from a frame of the plurality of frames. The IPE engine 114, during the encode mode, generates a predicted frame for a current frame.

The CALC engine 120, during the encode mode, inversely quantizes the predicted frames and performs inverse transformation on the result of inverse quantization. The CALC engine 120, during the decode mode, quantizes the compressed bit-stream, and performs transformation on the result of quantization. The MC engine 118 performs motion compensation on the motion information associated with the frames/compressed bit-stream. The LPF engine 122 filters an output of the CALC engine 120, and is used for improving video quality.

The ECD engine 124, in encode mode, generates a preliminary compressed bit-stream and preliminary encode status. The preliminary compressed bit-stream and the preliminary encode status are further processed in the controller 112 to generate a compressed bit-stream and encode status. The ECD engine 124, in decode mode, generates a preliminary frame and a preliminary decode status. The preliminary frame and the preliminary decode status are further processed in the controller 112 to generate a frame and an encode status.

The controller 112 operates in the encode mode when the controller 112 receives a plurality of frames and encode attributes associated with each frame of the plurality of frames. The controller 112 also configures the video hardware accelerator unit 104 to process a frame based on the encode parameters associated with the frame. Each frame is further divided into rectangular blocks or LCUs (largest coding units) or macro-blocks of 16×16, 32×32 or 64×64. An optimal size of the LCU is selected based on the video content.

Figure 2:
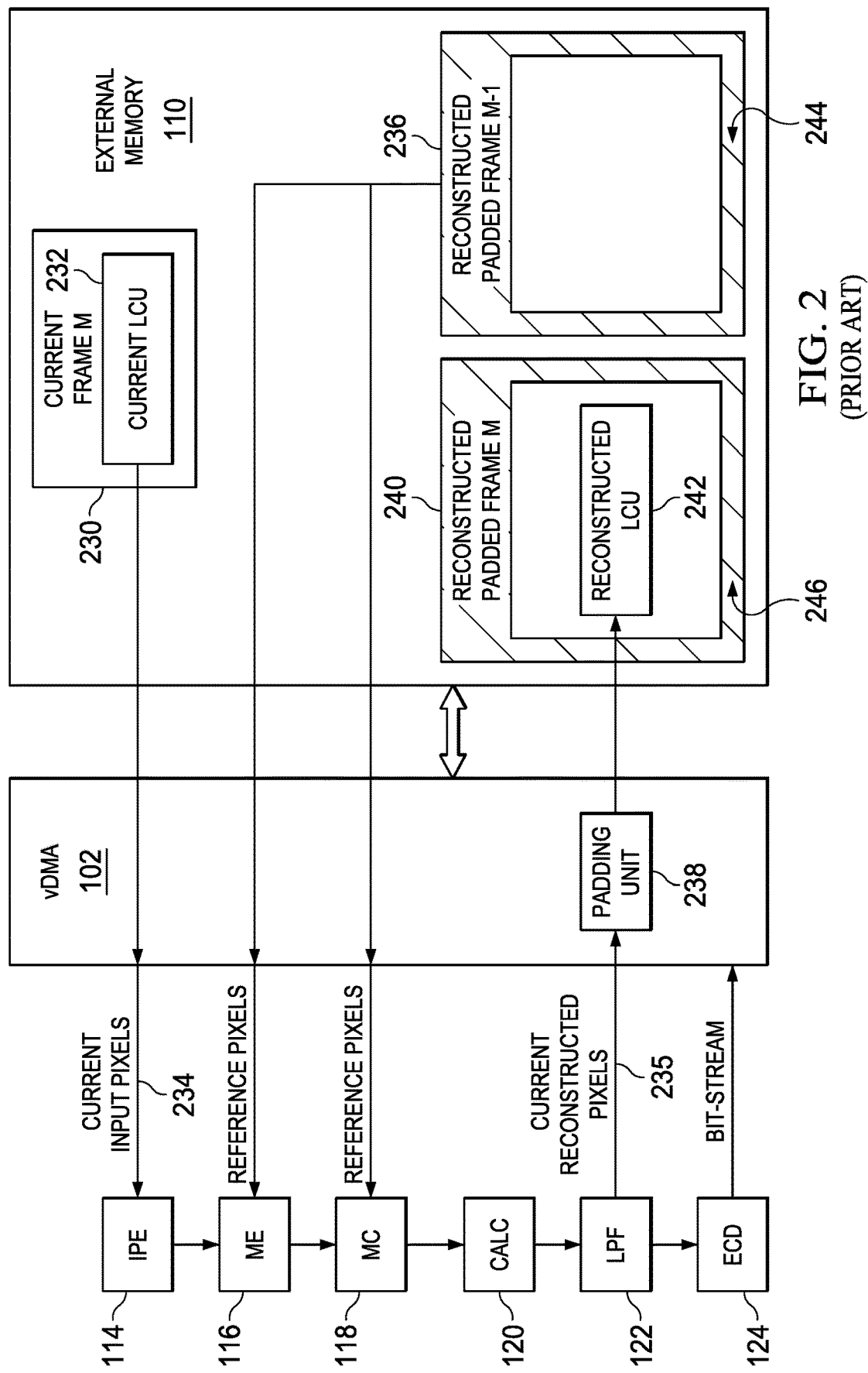
FIG. 2 is a block diagram illustrating a conventional operation of a video hardware engine.

FIG. 2 is a block diagram illustrating a conventional operation of a video hardware engine. The conventional operation is discussed in connection with the video hardware engine 100. The external memory 110 stores a plurality of frames corresponding to video data. The plurality of frames includes a current frame M 230 and a reconstructed padded frame M-1 236. The reconstructed padded frame M-1 236 is also defined as a reference frame 236.

The reconstructed padded frame M-1 236 is a frame that has been processed by the video hardware engine 100 in a previous cycle, and the current frame M 230 is processed in the video hardware engine 100 in a current cycle. Each frame of the plurality of frames includes rectangular blocks or LCUs (largest coding units) or macro-blocks of 16×16, 32×32 or 64×64 pixels. Thus, each LCU includes N×N pixels arranged in N rows and N columns.

The current frame M 230 also includes a plurality of LCUs, and a current LCU 232 is one LCU of the plurality of LCUs. The reconstructed padded frame M-1 236 (or the reference frame) includes a plurality of reference pixels. The video hardware engine 100 stores frames in padded format. Padding is a process of extending pixel values around edges of a frame. Padding is used for processing of the frame beyond its boundary. A region 244 in the reconstructed padded frame M-1 236 represents a padded region. The padded region includes pixels added to a reconstructed frame by a padding unit 238.

The controller 112 configures the vDMA engine 102 to perform a padding operation on the current frame M 230. The vDMA engine 102 configures the padding unit 238 to perform padding on the current frame M 230. The current frame M 230 after processing in the video hardware engine 100 and after the padding operation is stored in the external memory 110 as a reconstructed padded frame M 240. The padded frames are used in ME engine 116 and the MC engine.

The current LCU 232 includes current input pixels 234. The current input pixels are provided to the IPE engine 114. The IPE engine 114 receives the current LCU 232, and generates a predicted LCU for the current LCU 232. The ME engine 116 receives a set of reference pixels corresponding to the current LCU 232. The vDMA engine 102 provides the set of reference pixels from the reconstructed padded frame M-1 236 to the ME engine 116. The set of reference pixels, in one example, also includes pixels padded in the reconstructed padded frame M-1 236 (or the reference frame).

The ME engine 116 estimates motion information from the current LCU 232 and the set of reference pixels. The MC engine 118 determines a motion vector corresponding to the current LCU 232. The MC engine 118 configures the vDMA engine 102 to provide a set of reference pixels based on the motion vector corresponding to the current LCU 232. The vDMA engine 102 provides the set of reference pixels from the reconstructed padded frame M-1 236 to the ME engine 116. The set of reference pixels, in one example, also includes pixels padded in the reconstructed padded frame M-1 236 (or the reference frame). The MC engine 118 performs motion compensation on the motion information received from the ME engine 116, and generates a predicted LCU.

The CALC engine 120 inversely quantizes the predicted LCU and performs inverse transformation on the result of inverse quantization. The LPF engine 122 filters an output of the CALC engine 120 and is used for improving video quality. The LPF engine 122 generates current reconstructed pixels 235 which corresponds to a reconstructed LCU 242. The current reconstructed pixels are provided to the padding unit 238.

The ECD engine 124 generates a preliminary compressed bit-stream and preliminary encode status. The preliminary compressed bit-stream and the preliminary encode status are provided to the vDMA engine 102, and further processed in the controller 112 to generate a compressed bit-stream and encode status.

The padding unit 238 performs horizontal padding and vertical padding before writing the reconstructed frame into the external memory 110. A region 246 in the reconstructed padded frame M 240 represents a padded region. The padded region includes pixels added to a reconstructed frame by the padding unit 238. This operation increases consumption of external memory 110 as the reconstructed frames are padded before storing in the external memory 110.

In addition, the performance of the video hardware engine 100 is degraded because both the ME engine 116 and the MC engine 118 require reference pixels from the reconstructed padded frame M-1 236 for operation. If a width of the padded region is increased, it further degrades the performance of the video hardware engine 100. The padded region take approximately 9.4% additional write bandwidth for 1080p, and 14.3% additional bandwidth for 720p. For lower resolutions, this overhead is even more significant. In addition, while writing border LCUs, and additional data has to be written in the external memory 110. This becomes a bottleneck to achieve a uniform scaling of fps (frame per second) with lower resolution.

Figure 3:
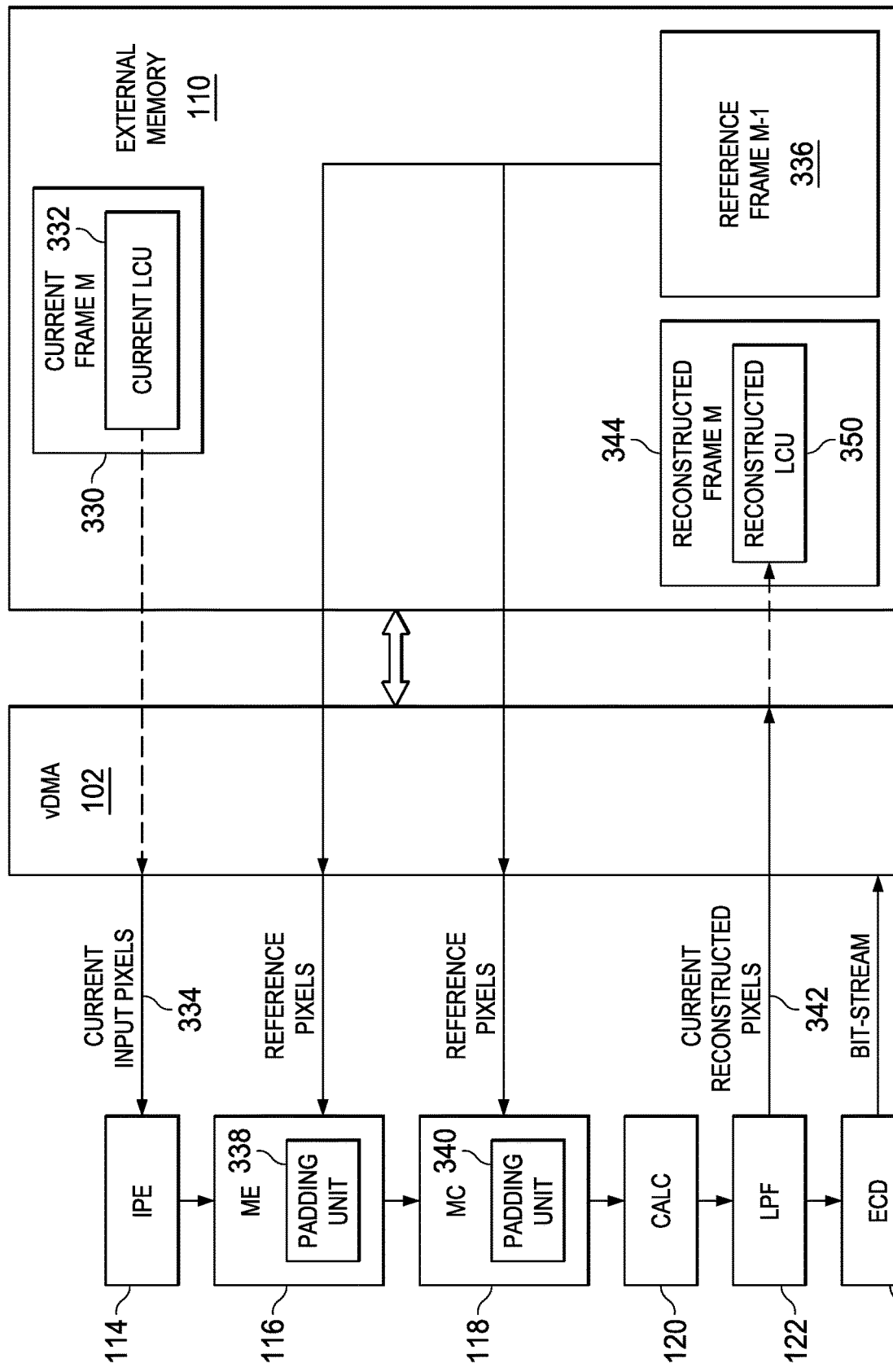
FIG. 3 is a block diagram illustrating an operation of a video hardware engine, according to an embodiment.

FIG. 3 is a block diagram illustrating an operation of a video hardware engine, according to an embodiment. The operation is discussed in connection with the video hardware engine illustrated in FIG. 1. The external memory 110 stores a plurality of frames corresponding to a video data. The plurality of frames includes a current frame M 330 and a reference frame M-1 336.

The reference frame M-1 336 is a frame that has been processed by the video hardware engine 100 in a previous cycle, and the current frame M 330 is processed in the video hardware engine 100 in a current cycle. Each frame of the plurality of frames includes rectangular blocks or LCUs (largest coding units) or macro-blocks of 16×16, 32×32 or 64×64 pixels. Thus, each LCU includes N×N pixels arranged in N rows and N columns.

The current frame M 330 also includes a plurality of LCUs, and a current LCU 332 is one LCU of the plurality of LCUs. The current frame M 330 is processed in the video hardware engine 100 to generate a reconstructed frame M 344, which is stored in the external memory 110. The reference frame M-1 336 includes a plurality of reference pixels. It is to be noted that both the reconstructed frame M 344 and the reference frame M-1 336 are not padded before storing in the external memory 110.

The current LCU 332 includes current input pixels 334. The current input pixels are provided to the IPE engine 114. The IPE engine 114 receives the current LCU 332, and generates a predicted LCU for the current LCU 232.

The ME engine 116 receives the current LCU 332. The ME engine 116 defines a search area around the current LCU 332 for motion estimation. The ME engine 116 also receives a set of reference pixels corresponding to the current LCU 332. The ME engine 116 configures the vDMA engine 102 to access the set of reference pixels from the external memory 110. The set of reference pixels of the plurality of reference pixels are received from the reference frame M-1 336 which is stored in the external memory.

The ME engine 116 pads a set of duplicate pixels along an edge of the reference frame M-1 336 when a part area of the search area is outside the reference frame M-1 336. The ME engine 116 provides a first set of boundaries around the current LCU 332. The first set of boundaries defines the search area for motion estimation. The current LCU 332 forms a center of the search area.

The ME engine 116 determines if a first boundary of the first set of boundaries is beyond the edge of the reference frame M-1 336, and also if the part area of the search area is outside the reference frame M-1 336. The ME engine 116 pad the set of duplicate pixels between the first boundary and the edge of the reference frame M-1 336 when the first boundary is beyond the edge of the reference frame M-1 336, and the part area of the search area is outside the reference frame. In one version, the ME engine 116 includes a padding unit 338 that is configured to pad the set of duplicate pixels between the first boundary and the edge of the reference frame M-1 336. The ME engine 116 estimates motion information.

The MC engine 118 receives the current LCU 332. The MC engine 118 determines a motion vector corresponding to the current LCU. In one example, the controller 112 provides the motion vector information to the MC engine 118. The MC engine 118 determines a motion reference LCU based on the motion vector. The MC engine 118 receives a set of reference pixels corresponding to the motion reference LCU. The set of reference pixels of the plurality of reference pixels are obtained from the reference frame M-1 336 which is stored in the external memory 110.

In one version, the MC engine 118 configures the vDMA engine 102 to access the set of reference pixels corresponding to the motion reference LCU from the external memory 110. The MC engine 118 pads a set of identical pixels along an edge of the reference frame M-1 336 when a part area of the motion reference LCU is outside the reference frame M-1 336.

The motion reference LCU comprises a second set of boundaries. When a second boundary of the second set of boundaries is beyond the edge of the reference frame M-1 336, and the part area of the motion reference LCU is outside the reference frame M-1 336, the MC engine 118 pads the set of identical pixels between the second boundary and the edge of the reference frame. In one version, the MC engine 118 includes a padding unit 340 that is configured to pad the set of identical pixels between the second boundary and the edge of the reference frame M-1 336.

The MC engine 118 performs motion compensation on the motion information received from the ME engine 116, and generates a predicted LCU. The CALC engine 120 inversely quantizes the predicted LCU and performs inverse transformation on the result of inverse quantization. The LPF engine 122 filters an output of the CALC engine 120 and is used for improving video quality. The LPF engine 122 generates current reconstructed pixels 342 which corresponds to a reconstructed LCU 350.

The ECD engine 124 generates a preliminary compressed bit-stream and preliminary encode status. The preliminary compressed bit-stream and the preliminary encode status are provided to the vDMA engine 102, and further processed in the controller 112 to generate a compressed bit-stream and encode status.

Thus, the ME engine 116 and the MC engine 118 performs dynamic frame padding. The padding is performed in ME engine 116 and the MC engine 118 when the current LCU 332 is received. Thus, the video hardware engine 100 is not required to store padded frames in the external memory 110. This reduces the memory requirement of the video hardware engine 100 drastically.

In addition, the performance of the video hardware engine 100 is improved because only a desired set of reference pixels are fetched from the external memory 110 while the padding is performed in the engines which require padded pixels for processing of the current LCU 332.

Figure 4:
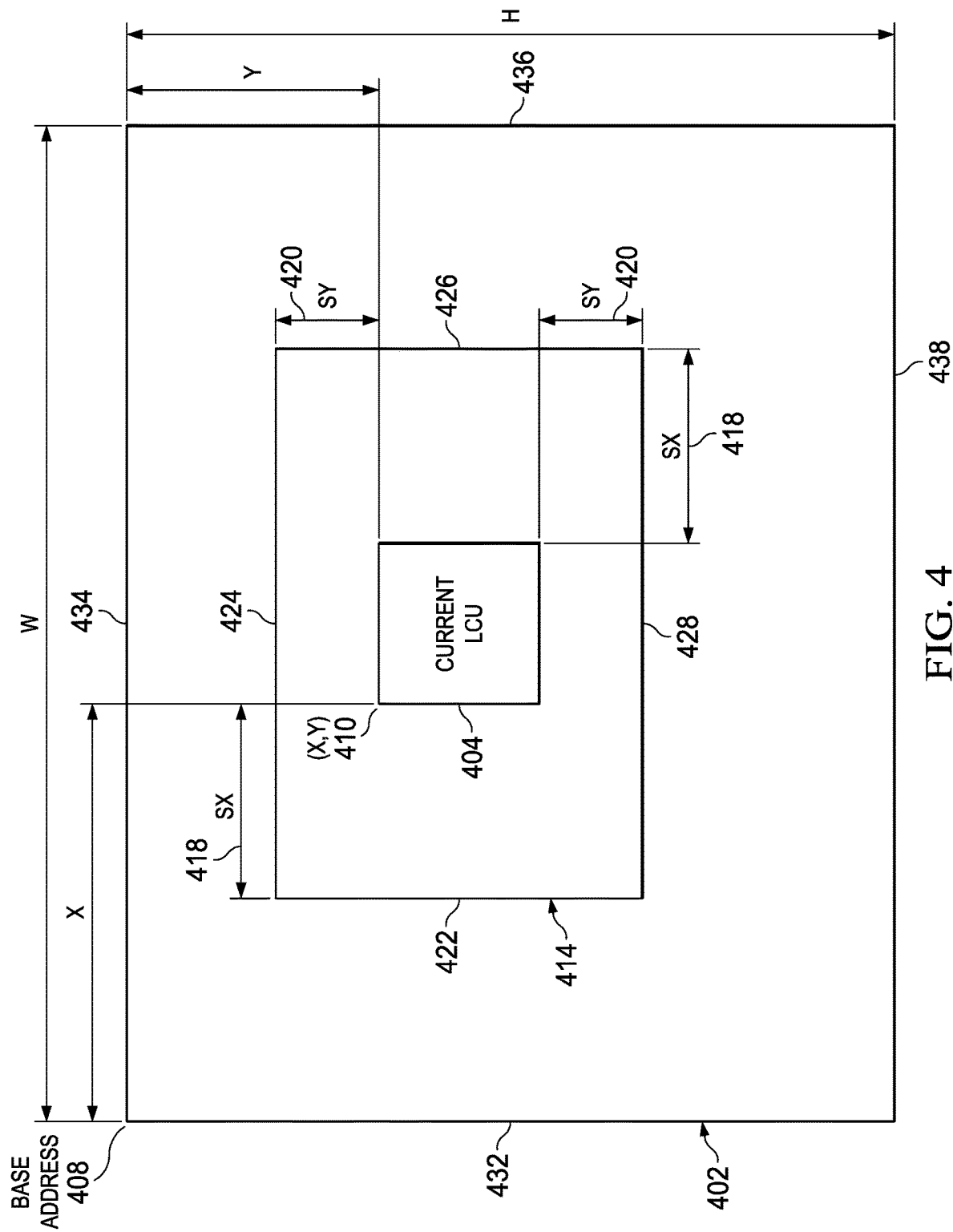
FIG. 4 illustrates a padding operation in a motion estimation (ME) engine, according to an embodiment.

FIG. 4 illustrates a padding operation in a motion estimation (ME) engine, according to an embodiment. The padding operation is illustrated for a current LCU 404 received in a motion estimation engine. The current LCU 404 is similar to the current LCU 332 (illustrated in FIG. 3). The padding operation is illustrated in connection with the ME engine 116 (illustrated in FIG. 1).

The ME engine 116 receives the current LCU 404. The current LCU 404 includes N×N pixels arranged in N rows and N columns. The ME engine 116 defines a search area 414 around the current LCU 404 for motion estimation. The current LCU 404 has defined coordinates (X,Y) 410 with respect to a reference frame 402. The reference frame 402 is similar to the reference frame M-1 336. The reference frame 402 has a base address 408. In an example, the base address has coordinates (0,0). The reference frame 402 has a width W and a height H. The reference frame 402 includes a plurality of reference pixels.

The ME engine 116 provides a first set of boundaries around the current LCU 404. The first set of boundaries define the search area 414 for motion estimation. In one example, the current LCU 404 forms a center of the search area 414. The first set of boundaries of the search area 414 includes a left boundary 422, a top boundary 424, a right boundary 426 and a bottom boundary 428.

The search area 414 includes a search range in X direction defined as SX 418 and, includes a search range in Y direction defined as SY 420. Thus, the search area 414 is defined as:

$$\text{Search Area}=(2*SX+N, 2*SY+N) \quad (1)$$

The ME engine 116 determines if a first boundary of the first set of boundaries is beyond an edge of the reference frame 402, and also if a part area of the search area 414 is outside the reference frame 402. The ME engine 116 pads a set of duplicate pixels between the first boundary and the edge of the reference frame 402 when the first boundary is beyond the edge of the reference frame 402, and the part area of the search area 414 is outside the reference frame 402. In one version, the ME engine 116 includes a padding unit that is configured to pad the set of duplicate pixels between the first boundary and the edge of the reference frame 402. This is explained in more detail in the following paragraphs.

The edge of the reference frame 402 is one of the following; a left vertical edge 432, a top horizontal edge 434, a right vertical edge 436 and a bottom horizontal edge 438. When the left boundary 422 of the search area 414 is beyond the left vertical edge 432 of the reference frame 402, and the part area of the search area 414 is outside the reference frame 402, the ME engine 116 pads a first set of duplicate pixels between the left boundary 422 and the left vertical edge 432. The first set of duplicate pixels are pixels in a first column of the reference frame 402.

When the top boundary 424 of the search area 414 is beyond the top horizontal edge 434 of the reference frame 402, and the part area of the search area 414 is outside the reference frame 402, the ME engine 116 pads a second set of duplicate pixels between the top boundary 424 and the top horizontal edge 434. The second set of duplicate pixels are pixels in a first row of the reference frame 402.

When the right boundary 426 of the search area 414 is beyond the right vertical edge 436 of the reference frame 402, and the part area of the search area 414 is outside the reference frame 402, the ME engine 116 pads a third set of duplicate pixels between the right boundary 426 and the right vertical edge 436. The third set of duplicate pixels are pixels in a last column of the reference frame 402.

When the bottom boundary 428 of the search area 414 is beyond the bottom horizontal edge 438 of the reference frame 402, and the part area of the search area 414 is outside the reference frame 402, the ME engine 116 pads a fourth set of duplicate pixels between the bottom boundary 428 and the bottom horizontal edge 438. The fourth set of duplicate pixels are pixels in a last row of the reference frame 402.

When two boundaries of the search area 414 are beyond two edges of the reference frame 402, and the part area of the search area 414 is outside the reference frame 402, the ME engine pads a set of duplicate pixels along the edges of the reference frame 402, and pads a corner pixel of the reference frame 402 in a part area of the search area which is beyond both of the two edges of the reference frame 402.

For example, in a case when left boundary 422 of the search area 414 is beyond the left vertical edge 432, and the top boundary 424 of the search area 414 is beyond the top horizontal edge 434 of the reference frame 402. Also, the part area of the search area 414 is outside the reference frame 402. The ME engine 116 pads the pixels in the first column of the reference frame 402 in between the left boundary 422 and the left vertical edge 432. The ME engine pads the pixels in the first row of the reference frame 402 between the top boundary 424 and the top horizontal edge 434. Also, the ME engine 116 pads a top left pixel in the part area of the search area 414 which is beyond both the left vertical edge 432 and the top horizontal edge 434 of the reference frame 402.

The amount of padding i.e. how many times a given pixel has to repeat in each direction is predefined in the ME engine 116. In one version, the amount of padding is defined in the ME engine 116 based on standards such as HEVC standard. The ME engine 116 also receives a set of reference pixels corresponding to the current LCU 404. The ME engine 116 configures the vDMA engine 102 to access the set of reference pixels from the external memory 110. The set of reference pixels of the plurality of reference pixels are received from the reference frame 402 which is stored in the external memory. The padding operation in the ME engine 116 is further explained in connection with FIG. 5A through FIG. 5E.

Figure 5A:
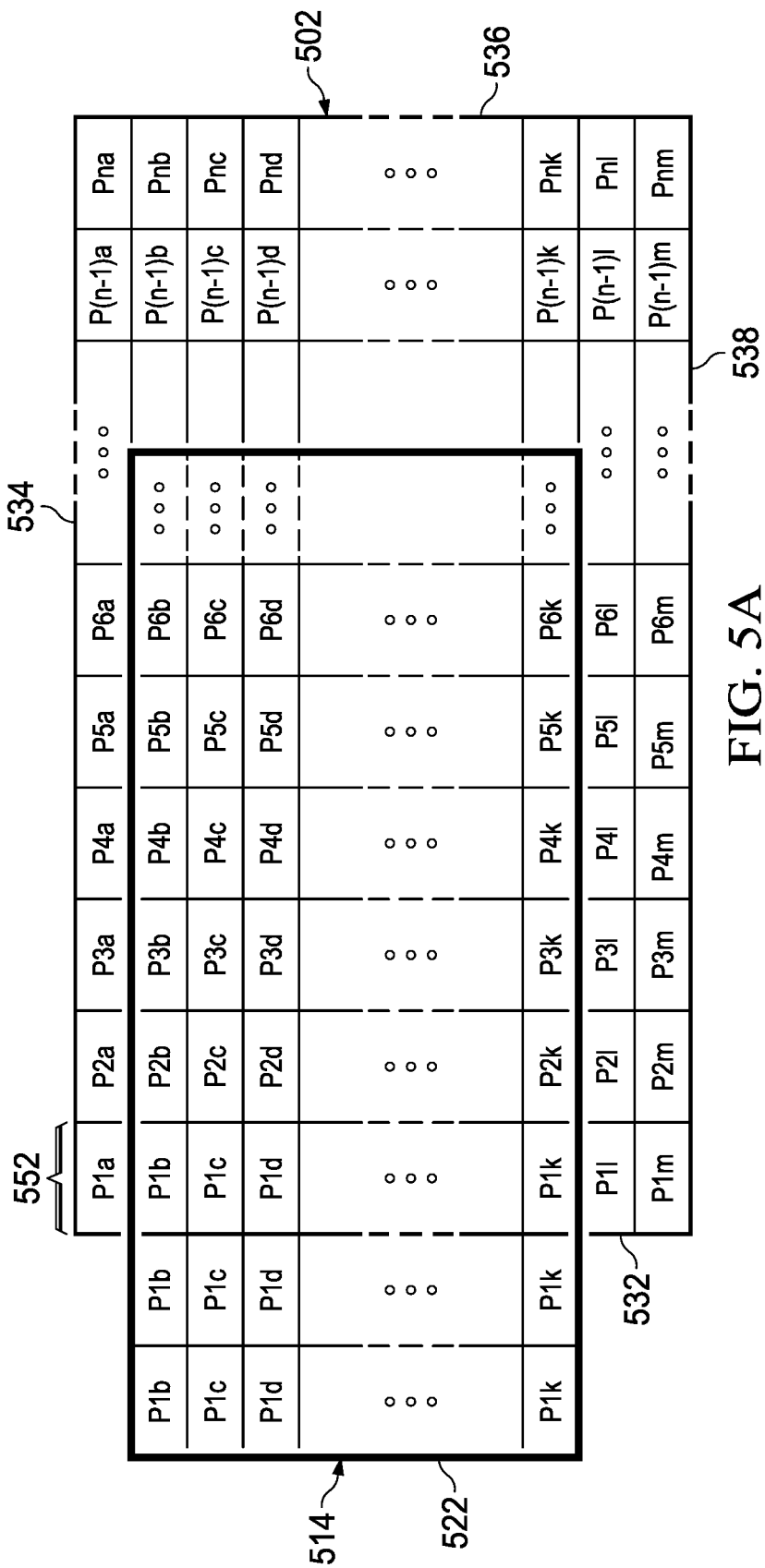
FIG. 5A through 5E illustrate padding operation in a motion estimation (ME) engine, according to an embodiment.

FIG. 5A-5E illustrate padding operation in a motion estimation (ME) engine, according to an embodiment. The ME engine, for example the ME engine 116, defines a search area 514 around a current LCU, for example current LCU 404 for motion estimation. FIG. 5A illustrates a reference frame 502. The reference frame 502 is similar to the reference frame 402 (illustrated in FIG. 4). The ME engine 116 provides a first set of boundaries around the current LCU. The first set of boundaries define the search area 514.

FIG. 5A illustrates a left boundary 522 of the search area 514. The reference frame 502 includes a left vertical edge 532, a top horizontal edge 534, a right vertical edge 536 and a bottom horizontal edge 538. FIG. 5A further illustrates that the left boundary 522 of the search area 514 is beyond the left vertical edge 532 of the reference frame 502, and a part area of the search area 514 is outside the reference frame 502. Thus, the ME engine pads a first set of duplicate pixels between the left boundary 522 and the left vertical edge 532.

The first set of duplicate pixels are pixels in a first column 552 of the reference frame 502. As illustrated, pixels in the first column 552 of the reference frame 502 are padded in the part area of the search area 514 which is outside the reference frame 502. Pixels P1n to P1k are padded between the left boundary 522 and the left vertical edge 532. As illustrated, pixel P1b is padded twice. The amount of padding i.e. how many times a given pixel has to repeat in each direction, in one example, is predefined in the ME engine. In another example, the amount of padding is proportional to the search area 514 defined by the ME engine.

Figure 5B:
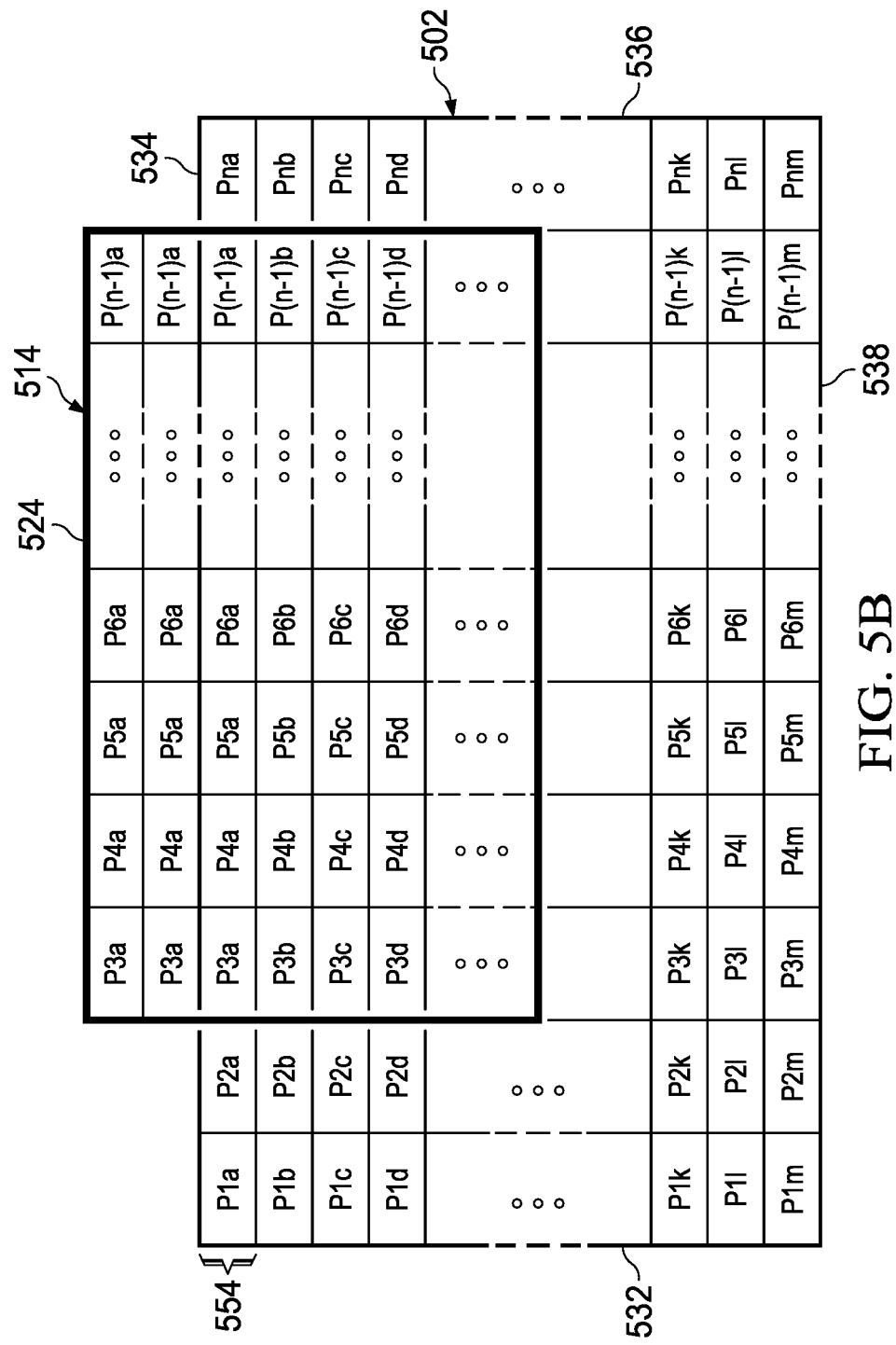

FIG. 5B illustrates a top boundary 524 of the search area 514. The reference frame 502 includes the left vertical edge 532, the top horizontal edge 534, the right vertical edge 536 and the bottom horizontal edge 538. FIG. 5B further illustrates that the top boundary 524 of the search area 514 is beyond the top horizontal edge 534 of the reference frame 502, and a part area of the search area 514 is outside the reference frame 502. Thus, the ME engine pads a second set of duplicate pixels between the top boundary 524 and the top horizontal edge 534.

The second set of duplicate pixels are pixels in a first row 554 of the reference frame 502. As illustrated, pixels in the first row 554 of the reference frame 502 are padded in the part area of the search area 514 which is outside the reference frame 502. Pixels P3a to P(n−1)a are padded between the top boundary 524 and the top horizontal edge 534.

Figure 5C:
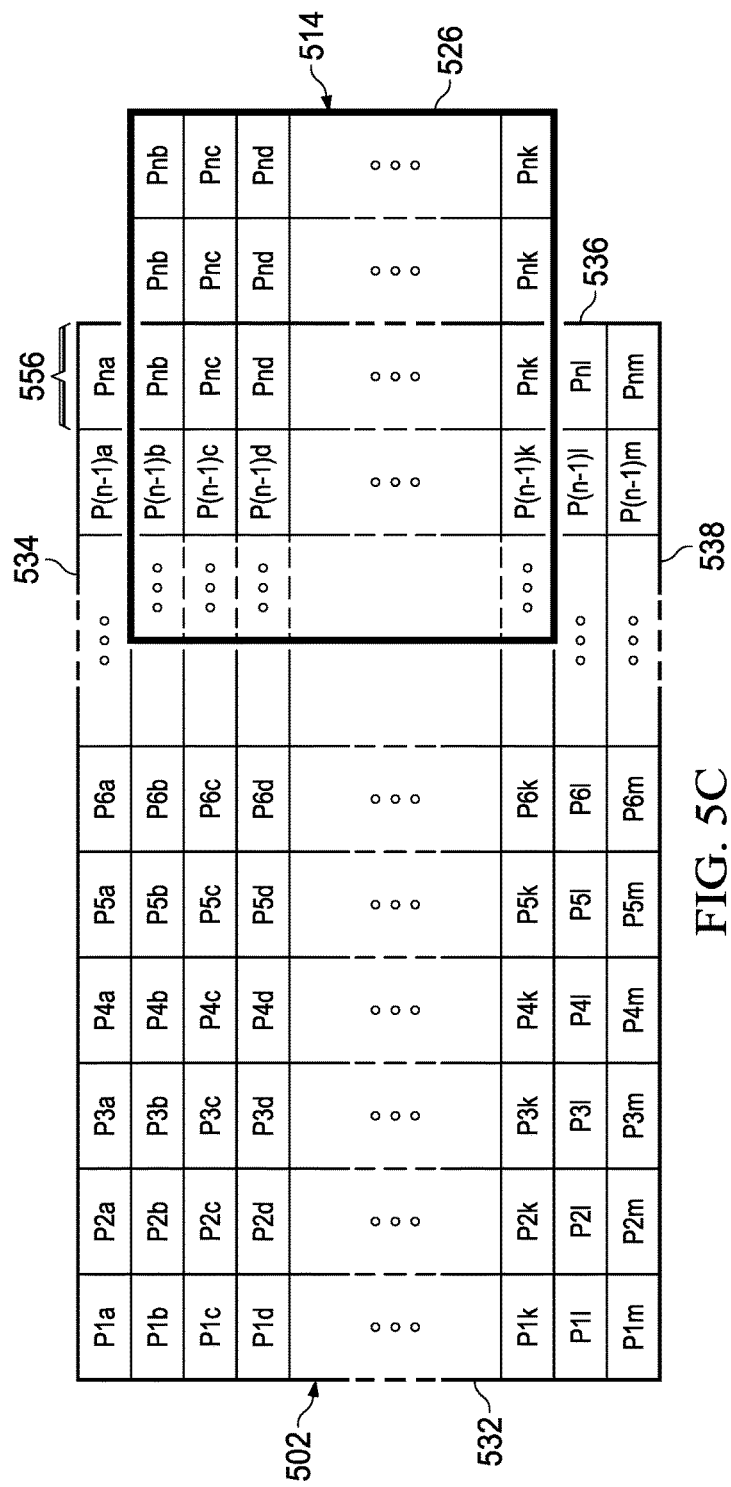

FIG. 5C illustrates a right boundary 526 of the search area 514. The reference frame 502 includes the left vertical edge 532, the top horizontal edge 534, the right vertical edge 536 and the bottom horizontal edge 538. FIG. 5C further illustrates that the right boundary 526 of the search area 514 is beyond the right vertical edge 536 of the reference frame 502, and a part area of the search area 514 is outside the reference frame 502. Thus, the ME engine pads a third set of duplicate pixels between the right boundary 526 and the right vertical edge 536.

The third set of duplicate pixels are pixels in a last column 556 of the reference frame 502. As illustrated, pixels in the last row 556 of the reference frame 502 are padded in the part area of the search area 514 which is outside the reference frame 502. Pixels Pnb to Pnk are padded between the right boundary 526 and the right vertical edge 536.

Figure 5D:
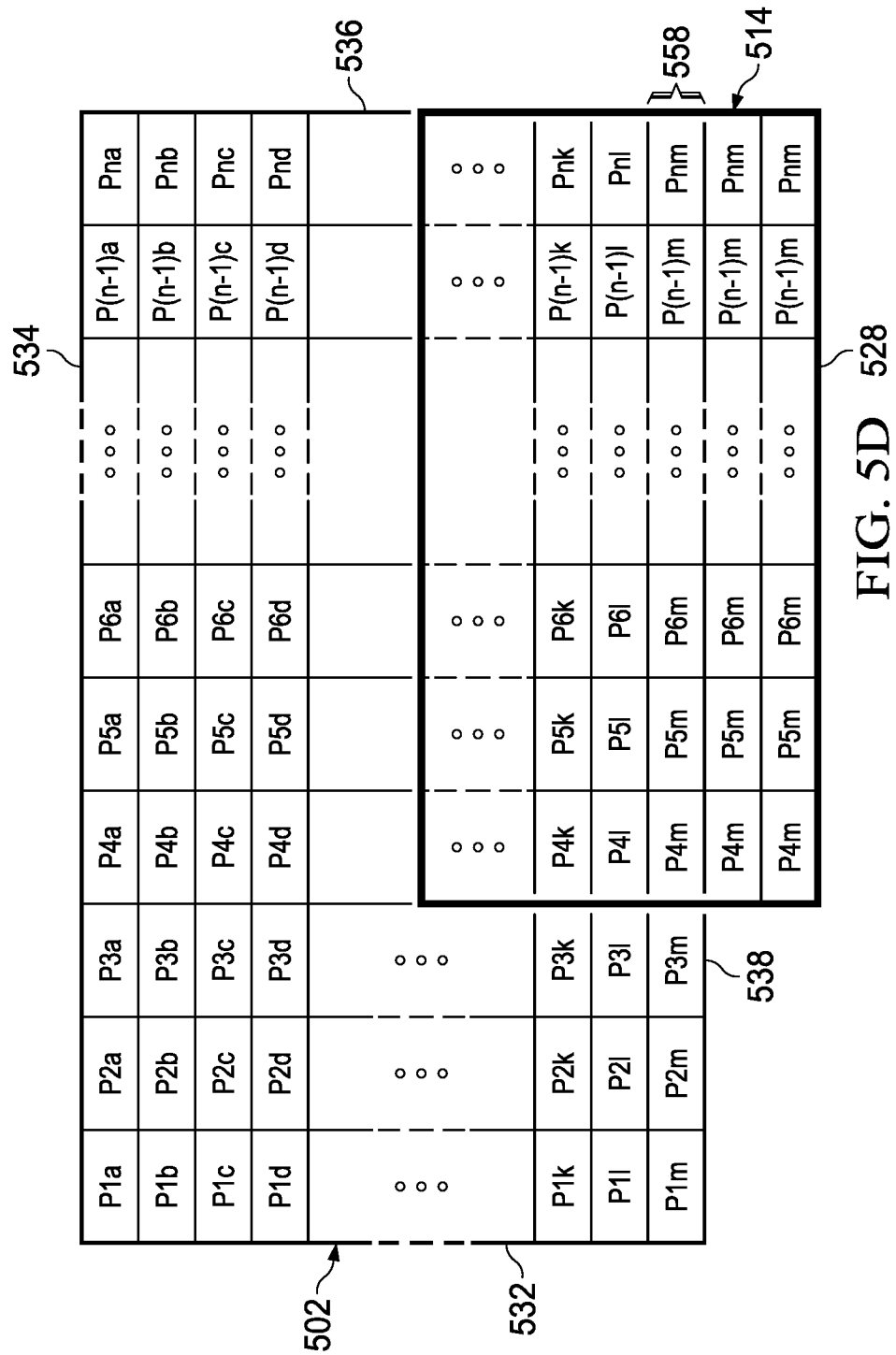

FIG. 5D illustrates a bottom boundary 528 of the search area 514. The reference frame 502 includes the left vertical edge 532, the top horizontal edge 534, the right vertical edge 536 and the bottom horizontal edge 538. FIG. 5D further illustrates that the bottom boundary 528 of the search area 514 is beyond the bottom horizontal edge 538 of the reference frame 502, and a part area of the search area 514 is outside the reference frame 502. Thus, the ME engine pads a fourth set of duplicate pixels between the bottom boundary 528 and the bottom horizontal edge 538.

The fourth set of duplicate pixels are pixels in a last row 558 of the reference frame 502. As illustrated, pixels in the last column 558 of the reference frame 502 are padded in the part area of the search area 514 which is outside the reference frame 502. Pixels P4m to Pnm are padded between the bottom boundary 528 and the bottom horizontal edge 538.

Figure 5E:
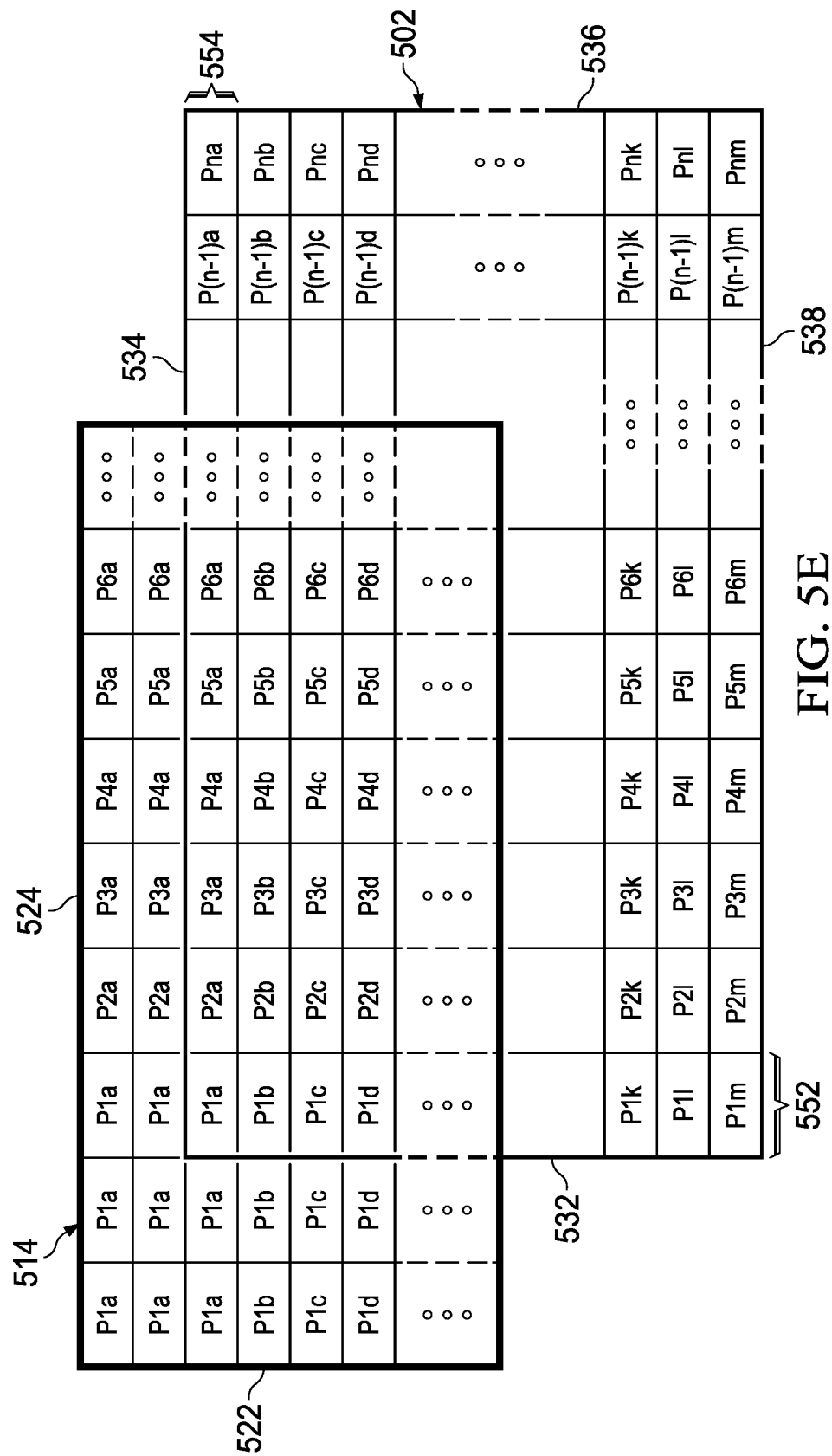

FIG. 5E illustrates a case when two boundaries of the search area 514 are beyond two edges of the reference frame 502, and the part area of the search area 514 is outside the reference frame 502. The left boundary 522 of the search area 514 is beyond the left vertical edge 532, and the top boundary 524 of the search area 514 is beyond the top horizontal edge 534 of the reference frame 502. Also, a part area of the search area 514 is outside the reference frame 502.

The ME engine pads the pixels in the first column 552 of the reference frame 502 in between the left boundary 522 and the left vertical edge 532. The ME engine pads the pixels in the first row 554 of the reference frame 502 between the top boundary 524 and the top horizontal edge 534. Also, the ME engine pads a top left pixel in the part area of the search area 514 which is beyond both the left vertical edge 532 and the top horizontal edge 534 of the reference frame 502. As illustrated the ME engine pads pixel Pla in the part area of the search area 514 which is beyond both the left vertical edge 532 and the top horizontal edge 534 of the reference frame 502.

Figure 6:
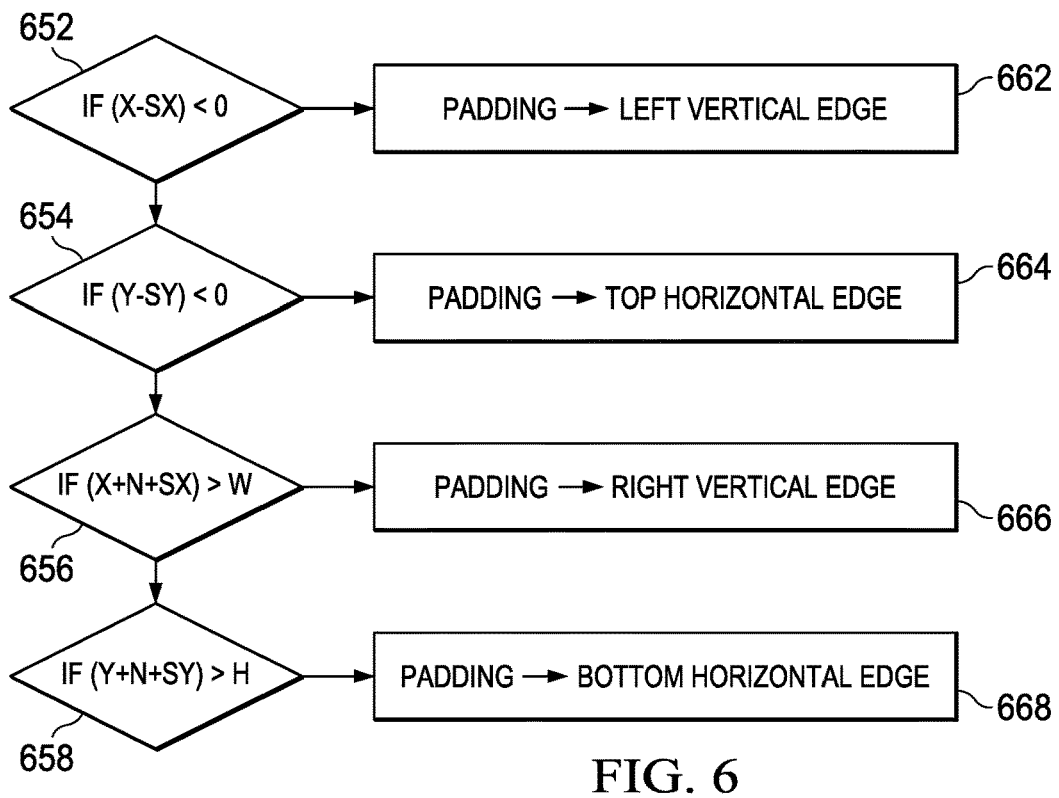
FIG. 6 is a flowchart illustrating a padding operation in a motion estimation engine, according to an embodiment.

FIG. 6 is a flowchart illustrating a padding operation in a motion estimation engine, according to an embodiment. The flowchart is explained in connection with FIG. 4. The padding operation is illustrated for a current LCU (similar to the current LCU 404) received in a motion estimation engine.

The current LCU includes N×N pixels arranged in N rows and N columns. The ME engine defines a search area (for example search area 414) around the current LCU 404 for motion estimation. The current LCU 404 has defined coordinates (X,Y) 410 with respect to a reference frame 402. The reference frame 402 has a width W and a height H. The reference frame 402 includes a plurality of reference pixels.

The search area 414 includes a search range in X direction defined as SX 418 and, includes a search range in Y direction defined as SY 420. The ME engine at step 652 determines, if X is less than the search range SX 418. If X is less than SX, then the ME engine performs step 662. At step 662, the ME engine performs padding along a left vertical edge of the reference frame. For example, in FIG. 5A, the ME engine pads, pixels in the first column 552 of the reference frame 502, along the left vertical edge 532.

If X is greater than SX, the ME engine proceeds to step 654. At step 654, the ME engine determines, if Y is less than the search range SY 420. If Y is less than SY, then the ME engine performs step 664. At step 664, the ME engine performs padding along a top horizontal edge of the reference frame. For example, in FIG. 5B, the ME engine pads, pixels in the first row 554 of the reference frame 502, along the top horizontal edge 534.

If Y is greater than SY, the ME engine proceeds to step 656. At step 656, the ME engine determines, if X+N+SX is less than the width W of the reference frame. If the condition is satisfied, then the ME engine performs step 666. At step 666, the ME engine performs padding along a right vertical edge of the reference frame. For example, in FIG. 5C, the ME engine pads, pixels in the last column 556 of the reference frame 502, along the right vertical edge 536.

If X+N+SX is greater than W, the ME engine proceeds to step 658. At step 658, the ME engine determines, if Y+N+SY is less than the height H of the reference frame. If the condition is satisfied, then the ME engine performs step 668. At step 668, the ME engine performs padding along a bottom horizontal edge of the reference frame. For example, in FIG. 5D, the ME engine pads, pixels in the last row 558 of the reference frame 502, along the bottom horizontal edge 538.

Figure 7:
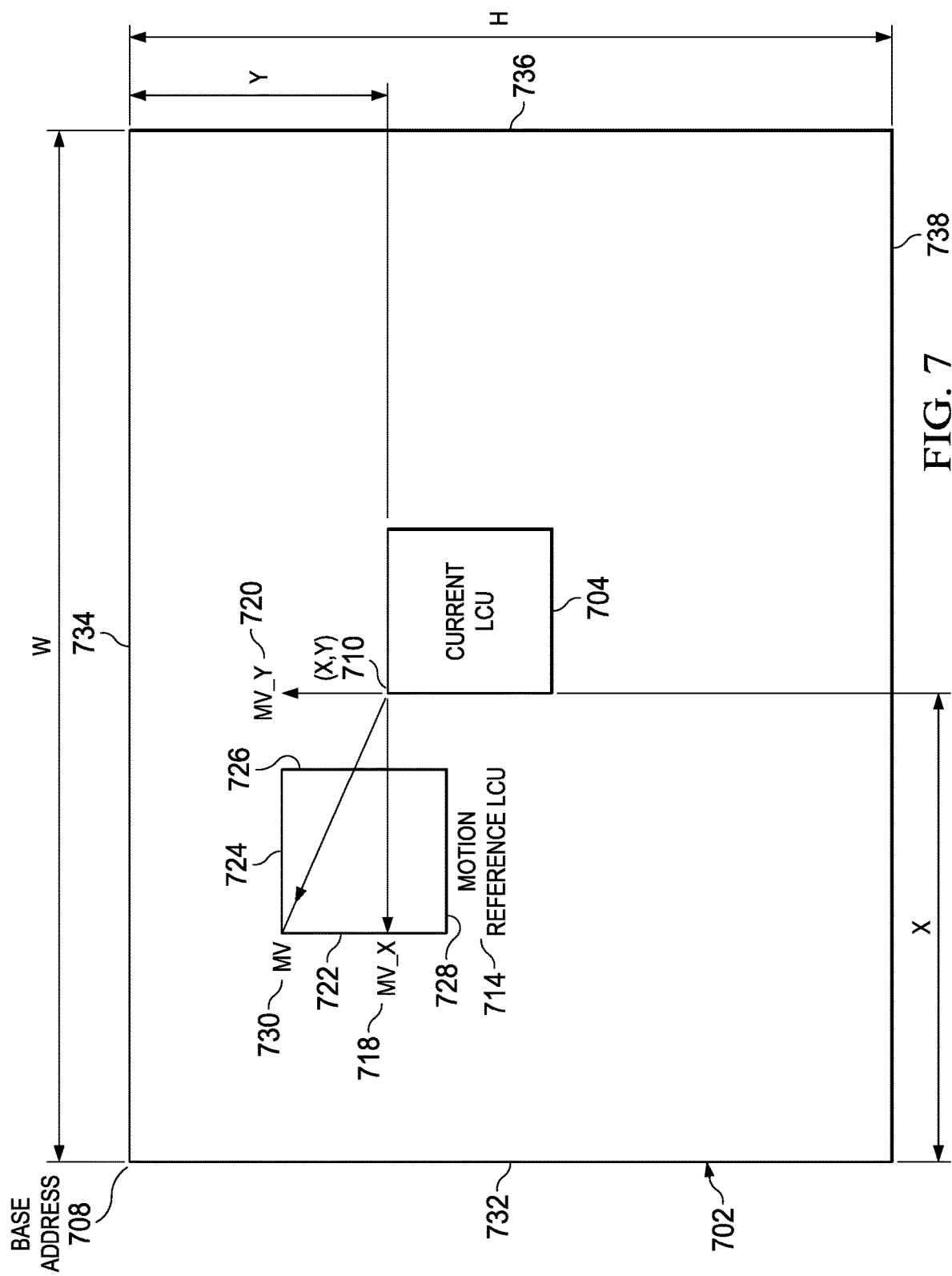
FIG. 7 illustrates a padding operation in a motion compensation (MC) engine, according to an embodiment.

FIG. 7 illustrates a padding operation in a motion compensation (MC) engine, according to an embodiment. The padding operation is illustrated for a current LCU 704 received in a motion compensation engine. The current LCU 704 is similar to the current LCU 332 (illustrated in FIG. 3). The padding operation is illustrated in connection with the MC engine 118 (illustrated in FIG. 1).

The MC engine 118 receives the current LCU 704. The current LCU 704 includes N×N pixels arranged in N rows and N columns. The MC engine 118 determines a motion vector MV 730 corresponding to the current LCU 704. The MC engine 118 determines a motion reference LCU 714 based on the motion vector MV 730. The current LCU 704 has defined coordinates (X,Y) 710 with respect to a reference frame 702. The reference frame 702 is similar to the reference frame M-1 336 (illustrated in FIG. 3). The reference frame 702 has a base address 708. In an example, the base address has coordinates (0,0). The reference frame 702 has a width W and a height H. The reference frame 702 includes a plurality of reference pixels.

The motion reference LCU 714 includes a second set of boundaries. The second set of boundaries of the motion reference LCU 714 includes a left boundary 722, a top boundary 724, a right boundary 726 and a bottom boundary 728.

The motion reference LCU 714 includes a motion vector in X direction defined as MV_X 718 and, includes a motion vector in Y direction defined as MV_Y 720. Thus, the motion vector MV 730 is defined as:

$$\text{Motion Vector MV} = (MV\_X, MV\_Y) \qquad (2)$$

The MC engine 118 determines if a second boundary of the second set of boundaries is beyond an edge of the reference frame 702, and also if a part area of the motion reference LCU 714 is outside the reference frame 702. The MC engine 118 pads a set of identical pixels between the second boundary and the edge of the reference frame 702 when the second boundary is beyond the edge of the reference frame 702, and the part area of the motion reference LCU 714 is outside the reference frame 702. In one version, the MC engine 118 includes a padding unit that is configured to pad the set of identical pixels between the second boundary and the edge of the reference frame 702. This is explained in more detail in the following paragraphs.

The edge of the reference frame 702 is one of the following: a left vertical edge 732, a top horizontal edge 734, a right vertical edge 736 and a bottom horizontal edge 738. When the left boundary 722 of the motion reference LCU 714 is beyond the left vertical edge 732 of the reference frame 702, and the part area of the motion reference LCU 714 is outside the reference frame 702, the MC engine 118 pads a first set of identical pixels between the left boundary 722 and the left vertical edge 732. The first set of identical pixels are pixels in a first column of the reference frame 702.

When the top boundary 724 of the motion reference LCU 714 is beyond the top horizontal edge 734 of the reference frame 702, and the part area of the motion reference LCU 714 is outside the reference frame 702, the MC engine 118 pads a second set of identical pixels between the top boundary 724 and the top horizontal edge 734. The second set of identical pixels are pixels in a first row of the reference frame 702.

When the right boundary 726 of the motion reference LCU 714 is beyond the right vertical edge 736 of the reference frame 702, and the part area of the motion reference LCU 714 is outside the reference frame 702, the MC engine 118 pads a third set of identical pixels between the right boundary 726 and the right vertical edge 736. The third set of identical pixels are pixels in a last column of the reference frame 702.

When the bottom boundary 728 of the motion reference LCU 714 is beyond the bottom horizontal edge 738 of the reference frame 702, and the part area of the motion reference LCU 714 is outside the reference frame 702, the MC engine 118 pads a fourth set of identical pixels between the bottom boundary 728 and the bottom horizontal edge 738. The fourth set of identical pixels are pixels in a last row of the reference frame 702.

When two boundaries of the motion reference LCU 714 are beyond two edges of the reference frame 702, and the part area of the motion reference LCU 714 is outside the reference frame 702, the MC engine 118 pads a set of identical pixels along the edges of the reference frame 702, and pads a corner pixel of the reference frame 702 in a part area of the motion reference LCU which is beyond both of the two edges of the reference frame 702.

For example, in a case when left boundary 722 of the motion reference LCU 714 is beyond the left vertical edge 732, and the top boundary 724 of the motion reference LCU 714 is beyond the top horizontal edge 734 of the reference frame 702. Also, the part area of the motion reference LCU 714 is outside the reference frame 702. The MC engine 118 pads the pixels in the first column of the reference frame 702 in between the left boundary 722 and the left vertical edge 732. The MC engine 118 pads the pixels in the first row of the reference frame 702 between the top boundary 724 and the top horizontal edge 734. Also, the MC engine 118 pads a top left pixel in the part area of the motion reference LCU 714 which is beyond both the left vertical edge 732 and the top horizontal edge 734 of the reference frame 702.

The amount of padding i.e. how many times a given pixel has to repeat in each direction is predefined in the MC engine 118. In one version, the amount of padding is defined in the MC engine 118 based on standards such as HEVC standard. The MC engine 118 also receives a set of reference pixels corresponding to the motion reference LCU 714. The MC engine 118 configures the vDMA engine 102 to access the set of reference pixels from the external memory 110. The set of reference pixels of the plurality of reference pixels are received from the reference frame 702 which is stored in the external memory.

The padding operation in the MC engine 118 can further be understood through FIG. 5A-5E. In FIG. 5A-5E, replace the search area 514 with the motion reference LCU 714, for understanding of padding operation performed by the MC engine.

Figure 8:
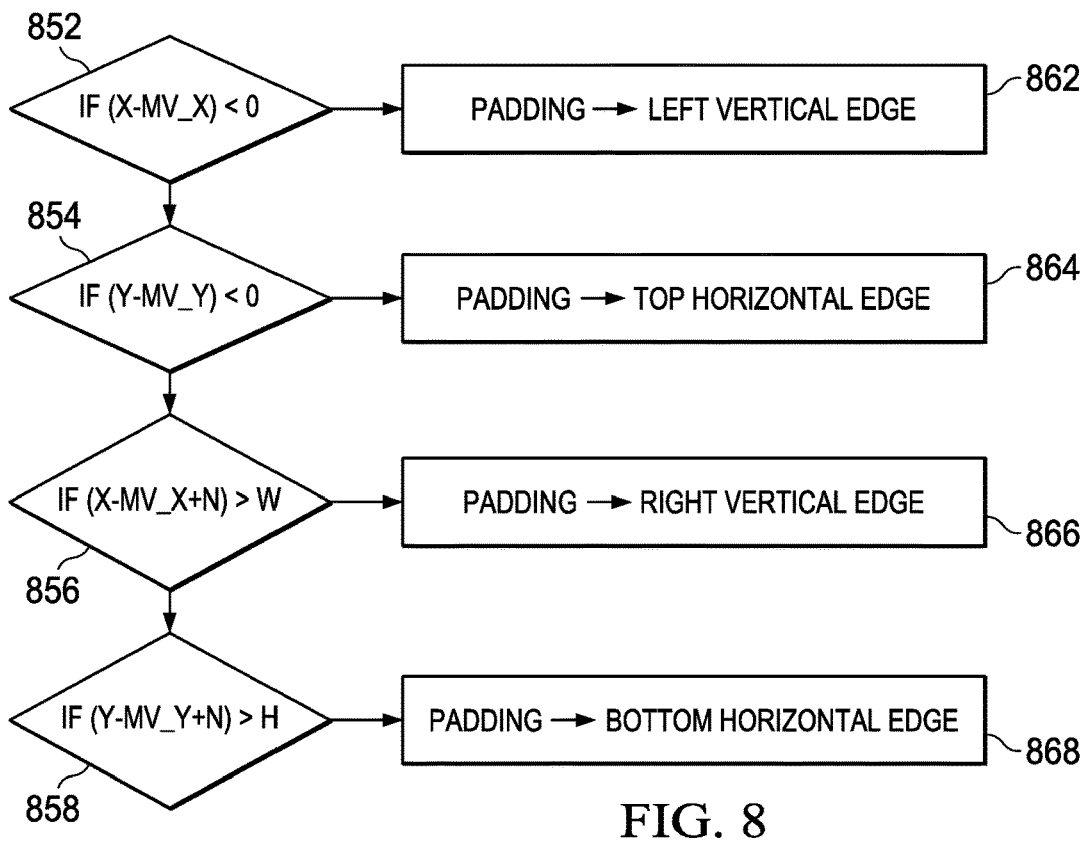
FIG. 8 is a flowchart illustrating a padding operation in a motion compensation engine, according to an embodiment.

FIG. 8 is a flowchart illustrating a padding operation in a motion compensation engine, according to an embodiment. The flowchart is explained in connection with FIG. 7. The padding operation is illustrated for a current LCU (similar to the current LCU 704) received in a motion compensation engine.

The current LCU includes N×N pixels arranged in N rows and N columns The MC engine 118 determines a motion vector MV 730 corresponding to the current LCU 704. The MC engine 118 determines a motion reference LCU 714 based on the motion vector MV 730. The current LCU 704 has defined coordinates (X,Y) 710 with respect to the reference frame 702. The reference frame 702 has a width W and a height H. The reference frame 702 includes a plurality of reference pixels.

The motion reference LCU 714 includes a motion vector in X direction defined as MV_X 718, and includes a motion vector in Y direction defined as MV_Y 720. The MC engine at step 852 determines, if X is less than the motion vector MV_X 718. If X is less than MV_X, then the MC engine performs step 862. At step 862, the MC engine performs padding along a left vertical edge of the reference frame. For example, in FIG. 5A, considering that search area 514 is the motion reference LCU 714, the MC engine pads, pixels in the first column 552 of the reference frame 502, along the left vertical edge 532.

If X is greater than MV_X, the MC engine proceeds to step 854. At step 854, the MC engine determines, if Y is less than the motion vector MV_Y 720. If Y is less than MV_Y, then the MC engine performs step 864. At step 864, the MC engine performs padding along a top horizontal edge of the reference frame. For example, in FIG. 5B, considering that search area 514 is the motion reference LCU 714, the MC engine pads, pixels in the first row 554 of the reference frame 502, along the top horizontal edge 534.

If Y is greater than MV_Y, the MC engine proceeds to step 856. At step 856, the MC engine determines, if X+N−MV_X is less than the width W of the reference frame. If the condition is satisfied, then the MC engine performs step 866. At step 866, the MC engine performs padding along a right vertical edge of the reference frame. For example, in FIG. 5C, considering that search area 514 is the motion reference LCU 714, the MC engine pads, pixels in the last column 556 of the reference frame 502, along the right vertical edge 536.

If X+N−MV_X is greater than W, the MC engine proceeds to step 858. At step 858, the MC engine determines, if Y+N−MV_Y is less than the height H of the reference frame. If the condition is satisfied, then the MC engine performs step 868. At step 868, the MC engine performs padding along a bottom horizontal edge of the reference frame. For example, in FIG. 5D, considering that search area 514 is the motion reference LCU 714, the MC engine pads, pixels in the last row 558 of the reference frame 502, along the bottom horizontal edge 538.

Figure 9:
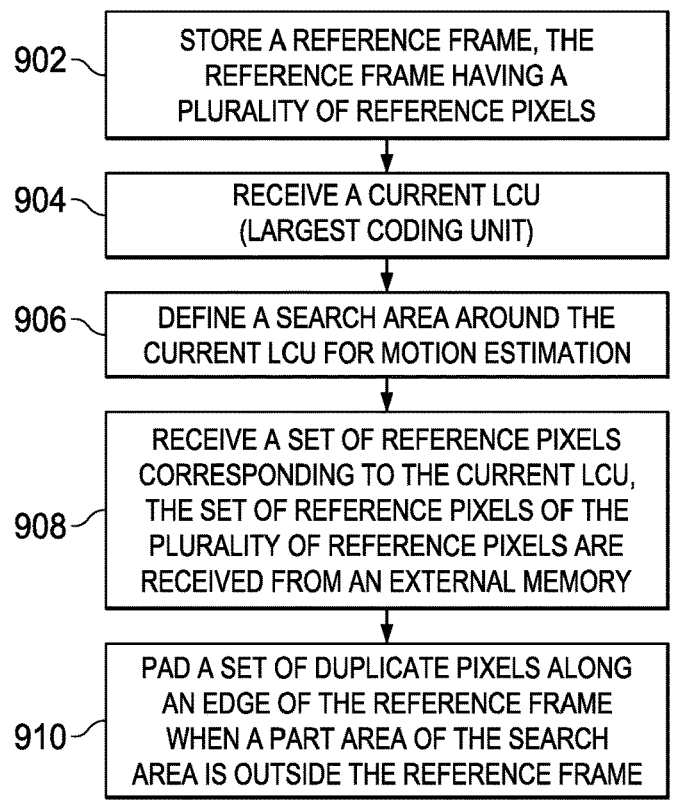
FIG. 9 is a flowchart illustrating a method of padding in a motion estimation engine, according to an embodiment.

FIG. 9 is a flowchart illustrating a method of padding in a motion estimation engine, according to an embodiment. At step 902, a reference frame is stored. For example, the reference frame 402 (illustrated in FIG. 4) is stored in an external memory, for example the external memory 110 (illustrated in FIG. 1). The reference frame includes a plurality of reference pixels. The reference frame has a width W and a height H.

A current LCU (largest coding unit) is received at step 904. The current LCU includes N×N pixels arranged in N rows and N columns. The current LCU has defined coordinates (X,Y) with respect to the reference frame. A search area is defined around the current LCU for motion estimation at step 906. For example, the ME engine 116 defines a search area 414 around the current LCU 404.

A first set of boundaries around the current LCU define the search area. In one example, the current LCU forms a center of the search area. The search area includes a search range in X direction defined as SX and, includes a search range in Y direction defined as SY. Thus, the search area is defined as:

$$\text{Search Area}=(2*SX+N, 2*SY+N) \quad (3)$$

At step 908, a set of reference pixels corresponding to the current LCU are received. The set of reference pixels of the plurality of reference pixels are received from the reference frame which is stored in an external memory. In one example, the ME engine configures a vDMA engine to access the set of reference pixels from the external memory.

At step 910, a set of duplicate pixels are padded along an edge of the reference frame when a part area of the search area is outside the reference frame. In one version, the ME engine determines if a first boundary of the first set of boundaries is beyond the edge of the reference frame, and also if the part area of the search area is outside the reference frame. The ME engine pads the set of duplicate pixels between the first boundary and the edge of the reference frame when the first boundary is beyond the edge of the reference frame, and the part area of the search area is outside the reference frame.

Figure 10:
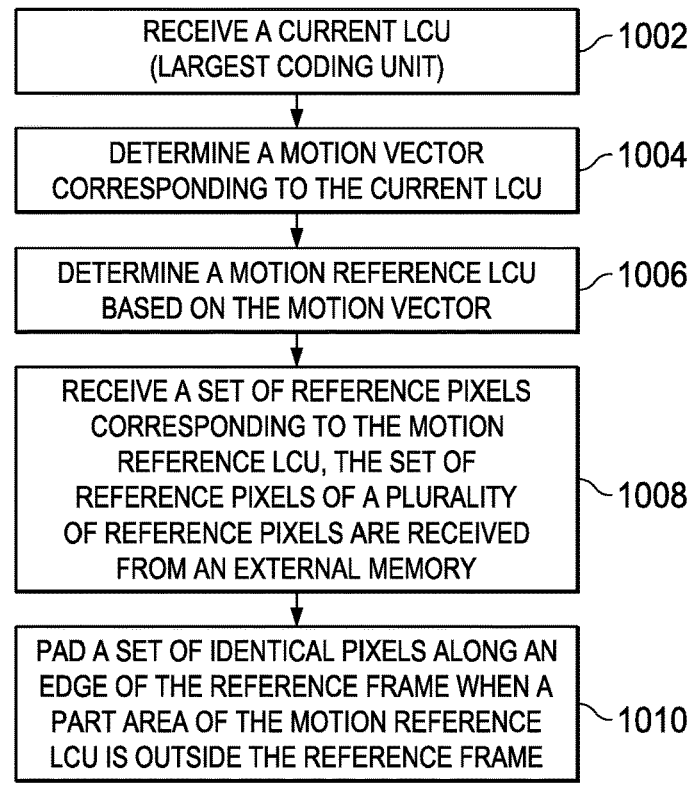
FIG. 10 is a flowchart illustrating a method of padding in a motion compensation engine, according to an embodiment.

FIG. 10 is a flowchart illustrating a method of padding in a motion compensation engine, according to an embodiment. At step 1002, a current LCU (largest coding unit) is received. The current LCU includes N×N pixels arranged in N rows and N columns. The current LCU has defined coordinates (X,Y) with respect to a reference frame. The reference frame includes a plurality of reference pixels.

At step 1004, a motion vector corresponding to the current LCU is determined. In one example, the MC engine determines a motion vector corresponding to the current LCU. In another example, a controller (such as controller 112) provides the motion vector information to the MC engine. A motion reference LCU is determined based on the motion vector at step 1006.

At step 1008, a set of reference pixels are received corresponding to the motion reference LCU. The set of reference pixels of a plurality of reference pixels are obtained from the reference frame which is stored in an external memory. In one version, the MC engine configures a vDMA engine to access the set of reference pixels corresponding to the motion reference LCU from the external memory. At step 1010, a set of identical pixels are padded along an edge of the reference frame when a part area of the motion reference LCU is outside the reference frame.

The motion reference LCU comprises a second set of boundaries. When a second boundary of the second set of boundaries is beyond the edge of the reference frame, and the part area of the motion reference LCU is outside the reference frame, the MC engine pads the set of identical pixels between the second boundary and the edge of the reference frame.

Figure 11:
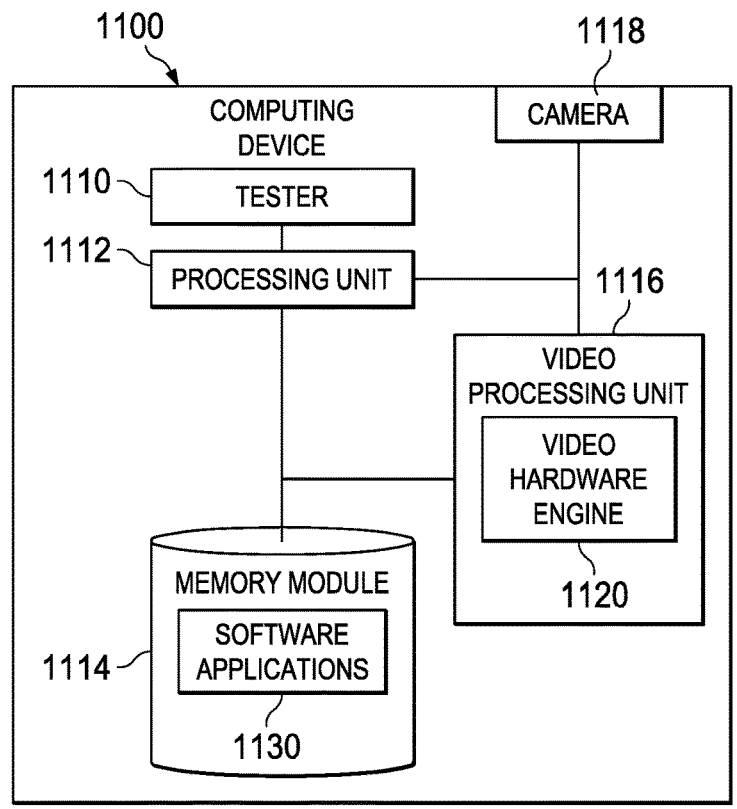
FIG. 11 illustrates a computing device according to an embodiment.

FIG. 11 illustrates a computing device 1100, according to an embodiment. The computing device 1100 is, or is incorporated into, a mobile communication device, such as a mobile phone, a personal digital assistant, a transceiver, a personal computer, or any other type of electronic system. The computing device 1100 may include one or more additional components known to those skilled in the relevant art and are not discussed here for simplicity of the description.

In some embodiments, the computing device 1100 comprises a megacell or a system-on-chip (SoC) which includes a processing unit 1112 such as a CPU (Central Processing Unit), a memory module 1114 (e.g., random access memory (RAM)) and a tester 1110. The processing unit 1112 can be, for example, a CISC-type (Complex Instruction Set Computer) CPU, RISC-type CPU (Reduced Instruction Set Computer), or a digital signal processor (DSP).

The memory module 1114 (which can be memory such as RAM, flash memory, or disk storage) stores one or more software applications 1130 (e.g., embedded applications) that, when executed by the processing unit 1112, performs any suitable function associated with the computing device 1100. The tester 1110 comprises logic that supports testing and debugging of the computing device 1100 executing the software applications 1130.

For example, the tester 1110 can be used to emulate a defective or unavailable component(s) of the computing device 1100 to allow verification of how the component(s), were it actually present on the computing device 1100, would perform in various situations (e.g., how the component(s) would interact with the software applications 1130). In this way, the software applications 1130 can be debugged in an environment which resembles post-production operation.

The processing unit 1112 typically comprises memory and logic which store information frequently accessed from the memory module 1114. A camera 1118 is coupled to the processing unit 1112. The computing device 1100 includes a video processing unit 1116. The video processing unit 1116 is coupled to the processing unit 1112 and the camera 1118. The video processing unit 1116 includes a video hardware engine 1120. The operation of the video hardware engine 1120 is similar the operation of the video hardware engine 300 illustrated in FIG. 3. The image/video data shot by the camera 1118 is processed in the video processing unit 1116.

The ME engine and the MC engine in the video hardware engine performs dynamic padding as discussed in connection with FIG. 3. The padding is performed in ME engine and the MC engine when a current LCU is received. Thus, the video hardware engine is not required to store padded frames in the external memory. This reduces the memory requirement of the video hardware engine drastically.

In addition, the performance of the video hardware engine is improved because only a desired set of reference pixels are fetched from the external memory while the padding is performed in the engines which require padded pixels for processing of the current LCU.

Figure 12:
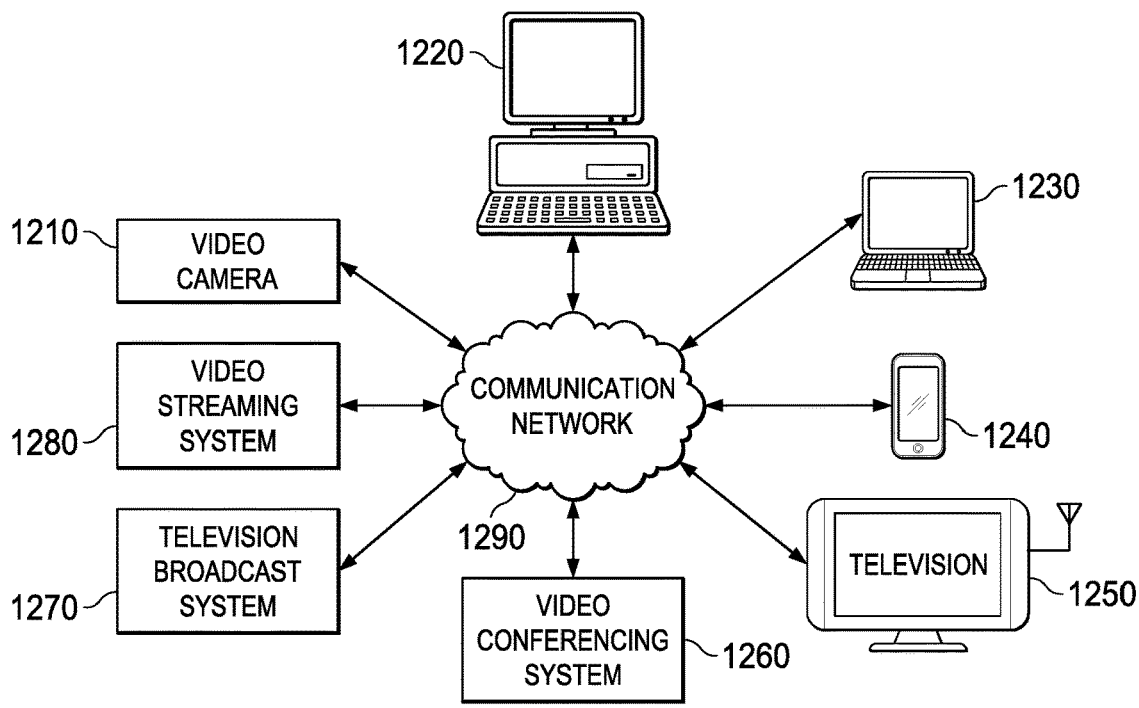
FIG. 12 is an example environment in which various aspects of the present disclosure may be implemented.

FIG. 12 is an example environment in which various aspects of the present disclosure may be implemented. As shown, the environment may comprise, for example, one or more video cameras 1210, computers 1220, personal digital assistants (PDA) 1230, mobile devices 1240, televisions 1250, video conference systems 1260, video streaming systems 1280, TV broadcasting systems 1270 and communication networks/channels 1290.

The video cameras 1210 are configured to take continuous pictures and generate digital video, a signal comprising sequence of image frames. The video cameras 1210 are configured to process the image frames for efficient storage and/or for transmission over the communication networks/channels 1290. The computers 1220, PDAs 1230 and the mobile devices 1240 are configured to encode the video signals for transmission and to decode encoded video signals received from the communication networks/channels 1290.

The video streaming systems 1280 is configured to encode video signal and to transmit the encoded video signals over the communication networks/channels 1290 responsive to a received request and/or asynchronously. The television broadcasting systems 1270 are configured to process video signals in accordance with one or more broadcast technologies and to broadcast the processed video signals over the communication networks/channels 1290.

The video conference systems 1260 are configured to receive a video signal from one or more participating/conferencing end-terminals (not shown) and to convert or compress the video signal for broadcasting or for transmitting to other participating user terminals. The television broadcasting systems 1270 are configured to receive encoded video signals from one or more different broadcasting centers (or channels), to decode each video signal and to display the decoded video signals on a display device (not shown).

As shown in FIG. 12, the devices and systems 1210-1280 are coupled to communication networks/channels 1290. Communication networks/channels 1290 supports an exchange of video signal encoded in accordance with one or more video encoding standards such as, but not limited to, H. 2123, H. 2124/AEC, and HEVC (H. 2126), for example. Accordingly, the devices and systems 1210-1280 are required to process (encode and/or decode) video signals complying with such standards.

The systems and devices 1210-1280 are implemented with one or more functional units that are configured to perform signal processing, transmitting and/or receiving of video signals from communication networks/channels 1290. When each device in the described environment performs video encoding or decoding, one or more embodiments described in this disclosure are used.

In the foregoing discussion, the terms "connected" means at least either a direct electrical connection between the devices connected or an indirect connection through one or more passive intermediary devices. The term "circuit" means at least either a single component or a multiplicity of passive or active components, that are connected together to provide a desired function. The term "signal" means at least one current, voltage, charge, data, or other signal. Also, the terms "connected to" or "connected with" (and the like) are intended to describe either an indirect or direct electrical connection. Thus, if a first device is coupled to a second device, that connection can be through a direct electrical connection, or through an indirect electrical connection via other devices and connections. The terms "inactivation" or "inactivated" or turn "OFF" or turned "OFF" is used to describe a deactivation of a device, a component or a signal. The terms "activation" or "activated" or turned "ON" describes activation of a device, a component or a signal.

Modifications are possible in the described embodiments, and other embodiments are possible, within the scope of the claims.

What is claimed is:

1. A video hardware engine comprising:
an external memory configured to store a reference frame, the reference frame having a plurality of reference pixels; and
a motion estimation engine configured to:
receive a current LCU (largest coding unit);
define a search area around the current LCU for motion estimation;
receive a set of reference pixels corresponding to the current LCU, the set of reference pixels of the plurality of reference pixels are received from the external memory; and
pad a set of duplicate pixels along an edge of the reference frame when a part area of the search area is outside the reference frame.

2. The video hardware engine of claim 1, wherein the motion estimation engine configures a vDMA (video direct memory access) engine to access the set of reference pixels corresponding to the current LCU from the external memory.

3. The video hardware engine of claim 1, wherein the motion estimation engine is further configured to:
provide a first set of boundaries around the current LCU, the first set of boundaries define the search area for motion estimation, and the current LCU forms a center of the search area;
determine if a first boundary of the first set of boundaries is beyond the edge of the reference frame, and if the part area of the search area is outside the reference frame; and
pad the set of duplicate pixels between the first boundary and the edge of the reference frame when the first boundary is beyond the edge of the reference frame and the part area of the search area is outside the reference frame.

4. The video hardware engine of claim 3, wherein the first set of boundaries comprises a left boundary, a top boundary, a right boundary and a bottom boundary.

5. The video hardware engine of claim 3, wherein the edge of the reference frame is at least one of a left vertical edge, a right vertical edge, a top horizontal edge and a bottom horizontal edge.

6. The video hardware engine of claim 3, wherein, the motion estimation engine is configured to pad a first set of duplicate pixels between the left boundary and the left vertical edge, when the left boundary is beyond the left vertical edge of the reference frame, and the part area of the search area is outside the reference frame, wherein the first set of duplicate pixels are pixels in a first column of the reference frame.

7. The video hardware engine of claim 3, wherein the motion estimation engine is configured to pad a second set of duplicate pixels between the top boundary and the top horizontal edge, when the top boundary is beyond the top horizontal edge of the reference frame, and the part area of the search area is outside the reference frame, wherein the second set of duplicate pixels are pixels in a first row of the reference frame.

8. The video hardware engine of claim 3, wherein the motion estimation engine is configured to pad a third set of duplicate pixels between the right boundary and the right vertical edge, when the right boundary is beyond the right vertical edge of the reference frame, and the part area of the search area is outside the reference frame, wherein the third set of duplicate pixels are pixels in a last column of the reference frame.

9. The video hardware engine of claim 3, wherein the motion estimation engine is configured to pad a fourth set of duplicate pixels between the bottom boundary and the bottom horizontal edge, when the bottom boundary is beyond the bottom horizontal edge of the reference frame, and the part area of the search area is outside the reference frame, wherein the fourth set of duplicate pixels are pixels in a last row of the reference frame.

10. The video hardware engine of claim 1 further comprising a motion compensation engine, the motion compensation engine configured to:
receive the current LCU;
determine a motion vector corresponding to the current LCU;
determine a motion reference LCU based on the motion vector;
receive a set of reference pixels corresponding to the motion reference LCU, the set of reference pixels of the plurality of reference pixels are received from the external memory; and
pad a set of identical pixels along an edge of the reference frame when a part area of the motion reference LCU is outside the reference frame.

11. The video hardware engine of claim 10, wherein the motion compensation engine configures the vDMA engine to access the set of reference pixels corresponding to the motion reference LCU from the external memory.

12. The video hardware engine of claim 10, wherein the motion reference LCU comprises a second set of boundaries.

13. The video hardware engine of claim 12, wherein when a second boundary of the second set of boundaries is beyond the edge of the reference frame, and the part area of the motion reference LCU is outside the reference frame, the motion compensation engine is configured to pad the set of identical pixels between the second boundary and the edge of the reference frame.

14. The video hardware engine of claim 13, wherein the second set of boundaries comprises a left boundary, a top boundary, a right boundary and a bottom boundary.

15. The video hardware engine of claim 13, wherein the edge of the reference frame is at least one of a left vertical edge, a right vertical edge, a top horizontal edge and a bottom horizontal edge.

16. The video hardware engine of claim 13, wherein the motion compensation engine is configured to pad a first set of identical pixels between the left boundary and the left vertical edge, when the left boundary is beyond the left vertical edge of the reference frame, and the part area of the motion reference LCU is outside the reference frame, wherein the first set of identical pixels are pixels in a first column of the reference frame.

17. The video hardware engine of claim 13, wherein the motion compensation engine is configured to pad a second set of identical pixels between the top boundary and the top horizontal edge, when the top boundary is beyond the top horizontal edge of the reference frame, and the part area of the motion reference LCU is outside the reference frame, wherein the second set of identical pixels are pixels in a first row of the reference frame.

18. The video hardware engine of claim 13, wherein the motion compensation engine is configured to pad a third set of identical pixels between the right boundary and the right vertical edge, when the right boundary is beyond the right vertical edge of the reference frame, and the part area of the motion reference LCU is outside the reference frame, wherein the third set of identical pixels are pixels in a last column of the reference frame.

19. The video hardware engine of claim 13, wherein the motion compensation engine is configured to pad a fourth set of identical pixels between the bottom boundary and the bottom horizontal edge, when the bottom boundary is beyond the bottom horizontal edge of the reference frame, and the part area of the motion reference LCU is outside the reference frame, wherein the fourth set of identical pixels are pixels in a last row of the reference frame.

20. A method comprising:
storing a reference frame, the reference frame having a plurality of reference pixels;
receiving a current LCU (largest coding unit);
defining a search area around the current LCU for motion estimation;
receiving a set of reference pixels corresponding to the current LCU, the set of reference pixels of the plurality of reference pixels received from an external memory; and
padding a set of duplicate pixels along an edge of the reference frame when a part area of the search area is outside the reference frame.

21. The method of claim 20 further comprising:
providing a first set of boundaries around the current LCU, the first set of boundaries define the search area for motion estimation such that the current LCU forms a center of the search area;
determining if a first boundary of the first set of boundaries is beyond the edge of the reference frame;
determining if the part area of the search area is outside the reference frame; and
padding the set of duplicate pixels between the first boundary and the edge of the reference frame when the first boundary is beyond the edge of the reference frame and the part area of the search area is outside the reference frame.

22. A method comprising:
receiving a current LCU (largest coding unit);
determining a motion vector corresponding to the current LCU;
determining a motion reference LCU based on the motion vector;
receiving a set of reference pixels corresponding to the motion reference LCU, the set of reference pixels of a plurality of reference pixels received from an external memory; and
padding a set of identical pixels along an edge of a reference frame when a part area of the motion reference LCU is outside the reference frame.

23. The method of claim 22, wherein the motion reference LCU comprises a second set of boundaries, and the reference frame includes the plurality of reference pixels.

24. The method of claim 22, wherein when a second boundary of the second set of boundaries is beyond the edge of the reference frame, and the part area of the motion reference LCU is outside the reference frame, padding the set of identical pixels between the second boundary and the edge of the reference frame.

25. A computing device comprising:
a processing unit;
a memory module coupled to the processing unit; and
a video processing unit coupled to the processing unit and the memory module, the video processing unit comprising a video hardware engine, the video hardware engine comprising:
  an external memory configured to store a reference frame, the reference frame having a plurality of reference pixels; and
  a motion estimation engine configured to:
    receive a current LCU (largest coding unit);
    define a search area around the current LCU for motion estimation;
    receive a set of reference pixels corresponding to the current LCU, the set of reference pixels of the plurality of reference pixels are received from the external memory; and
    pad a set of duplicate pixels along an edge of the reference frame when a part area of the search area is outside the reference frame.

* * * * *